2,803,567

ISOLATION OF ARABAN FROM SUGAR BEET PULP

Harry S. Owens, Berkeley, and Alan E. Goodban, Walnut Creek, Calif., assignors to the United States of America as represented by the Secretary of Agriculture No Drawing. Application February 20, 1956,
Serial No. 566,734

1 Claim. (Cl. 127—34)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to and has as its prime object the provision of improved methods for isolating araban from sugar beet pulp, the fibrous, largely cellulosic material remaining after extraction of sugar from sugar beets. Further objects and advantages of the invention will be obvious from the description herein.

The substance araban is a colloidal polysaccharide which is naturally present in many forms of plant life. It may also be referred to as a natural gum or mucilage and has many uses in common with other water-soluble gums. It is useful as an adhesive; a dispersing agent for emulsions, for instance, in water-thinned paints; as a thickening agent in the sizing, printing, and finishing of textiles; as a suspending agent in lotions, creams, salves, pastes; and so forth.

It is known that araban is present as a minor constituent in sugar beet pulp. Various methods have been devised for separating araban from beet pulp. The usual procedure is to extract the pulp with lime water to obtain an aqueous extract containing the araban, proteins, and calcium hydroxide. This extract is then acidified with acetic acid to reduce its pH to about 4 to precipitate protein impurities. The solution is then filtered and alcohol is added to the filtrate to precipitate the araban. This procedure generally gives good results but is expensive primarily because it requires the use of alcohol.

It has now been found that araban can be isolated from sugar beet pulp without the use of alcohol precipitation. As a consequence the process of this invention is less expensive to operate than the prior process. Briefly described, the process of this invention involves digestion of the pulp with lime water, carbonation of the resulting material to remove proteins and calcium, and finally evaporation of the purified extract to obtain the araban in a dry, solid state. The procedure is described more fully as follows:

The beet pulp is first digested with about 5 to 50 times its weight of water saturated with lime and preferably containing an excess of lime over the amount needed for saturation to ensure keeping the solution saturated during digestion. The digestion is generally carried out by boiling the reaction mixture for a period of about 2 hours. This digestion results in liberation of the araban from its physical or chemical combination with the cellulosic or pectinous constituents of the pulp. In the digestion, pectin naturally present in the pulp is largely depolymerized to pectic acids.

The reaction mixture is then carbonated, that is, carbon dioxide gas is passed into it. This carbonation is continued until the pH of the mixture is reduced to a level of 10 to 11, usually 10.7. By lowering the pH of the mixture to the above level, the precipitation of proteins dissolved during the digestion step is ensured. At this pH level, the proteins exhibit a maximum insolubility.

The carbonated mass is then subjected to mechanical treatment to separate the clear liquor from the undissolved material, the latter being chiefly cellulosic material, calcium pectate, calcium carbonate, and proteins. The separation may be effectuated by any conventional treatment such as filtration, centrifugation, sedimentation, etc.

The clear liquor from the above step is then carbonated further to reduce its pH to the range 8 to 9 whereby to precipitate remaining calcium as calcium carbonate. The carbonated liquor is then subjected to filtration, centrifugation, or the like to separate the clear liquor from the precipitate of calcium carbonate.

This clarified liquor now essentially contains only araban. To obtain this material in a dry state, the liquor is reduced to dryness by evaporation. Preferably the liquor is evaporated until it forms a syrupy mass and this syrup is reduced to dryness on conventional dehydration equipment such as a spray drier, drum drier, tray drier or the like.

The dried araban product is obtained as a tan to brown powder or flake (depending on the method of dehydration) and is useful for any of the applications described above. If a lighter colored product is desired, the clarified liquor from the second carbonation step may be boiled with charcoal, activated carbon or the like to remove pigmented impurities. After this decolorizing treatment the liquor is reduced to dryness as previously described.

It is a significant feature of the process of this invention that the lime extract is treated by carbonation to precipitate impurities thus yielding a clarified liquor which contains essentially only the araban in solution. That it would be possible to thus precipitate the impurities without at the same time precipitating the araban is a surprising effect of the process. Thus, in conventional defecation processes as applied to sugar-containing liquors, it is common to add lime and to carbonate the limed juice to precipitate calcium carbonate. One of the advantages of this known technique is that the calcium carbonate precipitate has great occlusive or adsorptive powers so that it takes out of solution much of the dissolved colloidal material, such as proteins and pectin, thus producing a purified sugar solution from which pure sugar can be crystallized. It would be expected from the above that carbonation of the aqueous lime extract from sugar beet pulp would result in removal of araban by its adsorption on the calcium carbonate precipitate. It was found however that such an expected action does not take place and instead the araban remains in solution during the carbonation procedures.

The invention is further demonstrated by the following example.

One hundred grams of dried sugar beet pulp and 50 g. of lime is placed in 3 liters of water and the mixture is boiled for 2 hours. Carbon dioxide is bubbled into the mixture until the pH is 10.7. The material is then filtered to remove pulp, undissolved lime, some calcium carbonate, and precipitated proteins. Carbon dioxide is bubbled into the filtrate until the pH of the liquid is 9.

The liquid is filtered to remove precipitated calcium carbonate. The filtrate is evaporated to dryness to obtain 7 grams of araban as a brown powder.

Having thus described the invention, we claim:

The process for recovering araban from sugar beet pulp, the fibrous, largely cellulosic material remaining after extraction of sugar from sugar beets, which comprises digesting the pulp with aqueous lime to liberate araban from the pulp, introducing carbon dioxide into the reaction mixture until a pH of about 10 to 11 is established, separating the clear liquor from the insoluble material, introducing carbon dioxide into the liquor until a pH of about 8 to 9 is established, separating the clear liquor from the insoluble material, and reducing the so-obtained liquor to dryness.

References Cited in the file of this patent

UNITED STATES PATENTS 1,538,004   E. Ricard _____ May 19, 1925